May 22, 1945. R. N. DICKEY 2,376,585
WAFFLE IRON
Original Filed Jan. 26, 1942 2 Sheets-Sheet 1

INVENTOR
ROY H. DICKEY
BY Cook & Robinson
ATTORNEY

May 22, 1945.  R. N. DICKEY  2,376,585
WAFFLE IRON
Original Filed Jan. 26, 1942   2 Sheets-Sheet 2
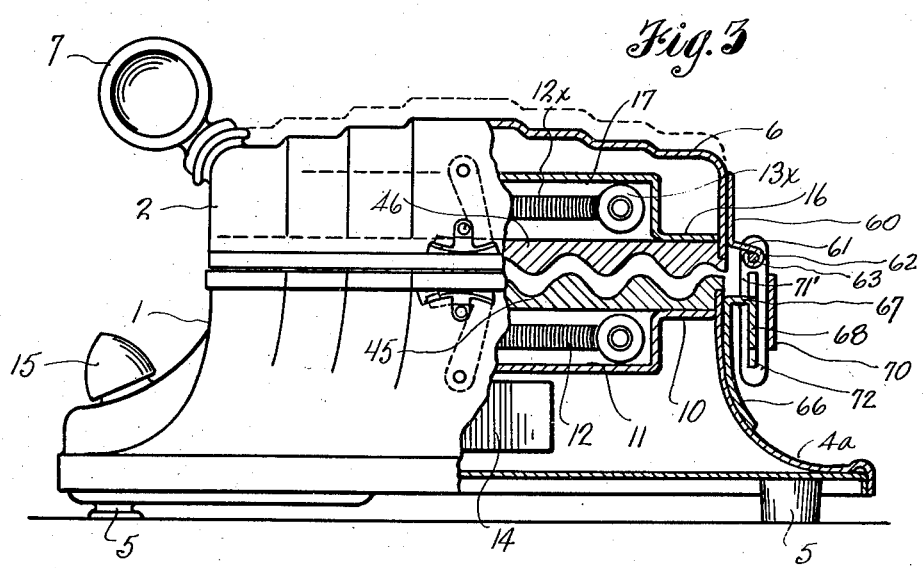
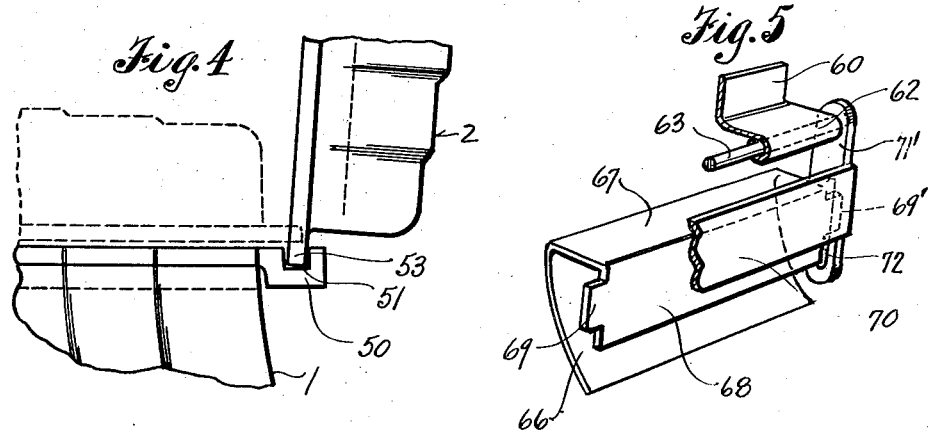
INVENTOR
ROY N. DICKEY
BY
Cook & Robinson
ATTORNEY Patented May 22, 1945

2,376,585

UNITED STATES PATENT OFFICE 2,376,585

WAFFLE IRON

Roy N. Dickey, Seattle, Wash., assignor to Meets-A-Need Manufacturing Company, Seattle, Wash., a corporation of Washington Original application January 26, 1942, Serial No. 428,202. Divided and this application January 18, 1943, Serial No. 472,654

1 Claim. (Cl. 99—340)

This invention relates to electrically heated cooking utensils, and has reference more particularly to improvements in cooking utensils of that character illustrated and described in U. S. Letters Patent No. 1,907,441, issued May 9, 1933, to John Campbell and Clarence H. Pickering; the present improvement being in the provision of means for adapting utensils of the character described in the above patent for the cooking of waffles, and is a divisional part of my copending application filed January 26, 1942, under Serial No. 428,202.

More specifically stated, the present invention has to do with certain improvements in devices of that kind shown in the above mentioned patent to Campbell et al., relating to adaptation of the utensil to waffle cooking and embodying therein an expandable hinge for the attachment of the top section to the bottom or base section, to permit that relative spreading movement of the parts that is desirable in view of the expanding of the waffle batter while being cooked between the complemental sections, and which also permits the full opening of the sections for the anticipated use of the device for cooking hotcakes, as disclosed in the above mentioned patent.

It is the principal object of this invention to provide convenient means whereby the top section may be supported in a raised position for the putting of waffle batter in the iron or for removal of the cooked waffle.

More specifically stated, the present invention resides in the provision, in a cooking utensil of this kind, of means on the plates applied to top and bottom sections of the utensil, that may be readily engaged upon opening of the sections apart, to lock the top section in raised position, and may also be easily and readily disengaged for closing the parts together.

Other objects of the invention reside in the details of construction and combination of parts, as will hereinafter be fully described.

In accomplishing these and other objects of the invention, I have provided the improved details of construction, the preferred forms of which are illustrated in the accompanying drawings wherein—

Fig. 3 is a partial end view, and partial cross-sectional view of the utensil with the sections closed together and showing the hinge connection of the top and bottom sections whereby expansion of a waffle in cooking is provided for.

Fig. 4 is a detail illustrating the cooperating parts provided on the complemental waffle plates whereby the hingedly attached top section of the utensil may be supported in its raised position.

Fig. 5 is a perspective detail of the hinge connection; parts being broken away for better illustration.

The present device is designed somewhat along the plan of the device of the previously mentioned patent. However, it is to be explained that while the device of the patent comprises electrically heated, and hingedly attached complemental sections, adapted to be opened apart to provide two horizontal cooking surfaces, and cake molds are provided and usable for transferring of hotcakes from one surface to the other and for turning them over incident to their transfer, the patent does not contemplate, nor is it adapted to the interchangeable use of plates for the baking of waffles or hotcakes, and could not, as designed, be used satisfactorily for waffles, due to the character of the plates and the type of hinge connection used. In a copending application, Serial No. 428,202, filed January 26, 1942, I have described the present type of expandable hinge, and have illustrated the device for waffle cooking. This application relates to the same structure and in addition, its claims are to be based on the special support, that is used in combination with the expandable hinge, to support the top section in an upright open position.

Referring more in detail to the drawings—

Figure 1:
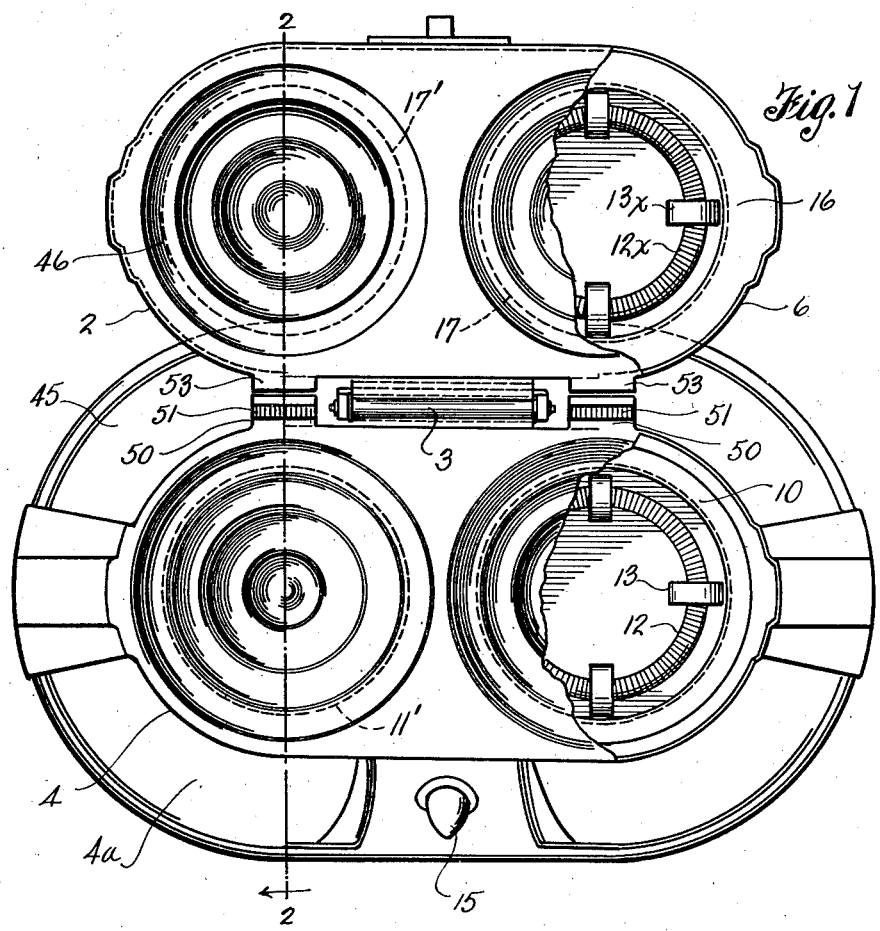
Fig. 1 is a plan view of the present utensil, showing the top section fully opened.

In its present preferred form of construction, the cooking utensil as embodied by this invention comprises complemental base and top sections; the former being designated in its entirety by reference numeral 1, and the latter section being designated in its entirety by reference numeral 2. These two sections are connected by a hinge structure, designated generally at 3, which permits the top section to be swung upwardly about a horizontal axis, from its closed position resting flatly upon the base, as seen in Fig. 3, to open position in which it is shown in Figs. 1 and 2, thus to provide two horizontal heating surfaces lying substantially in the same plane for the cooking of hot cakes, as described in the copending application of which this is a divisional part.

In the present instance, the base section 1 comprises an enclosing housing 4 of metal and of oval outline, formed with a flaring skirt, or base portion 4a, and this is equipped with suitable legs 5 whereby to sustain the device spaced somewhat above any supporting surface on which it might be placed.

Figure 2:
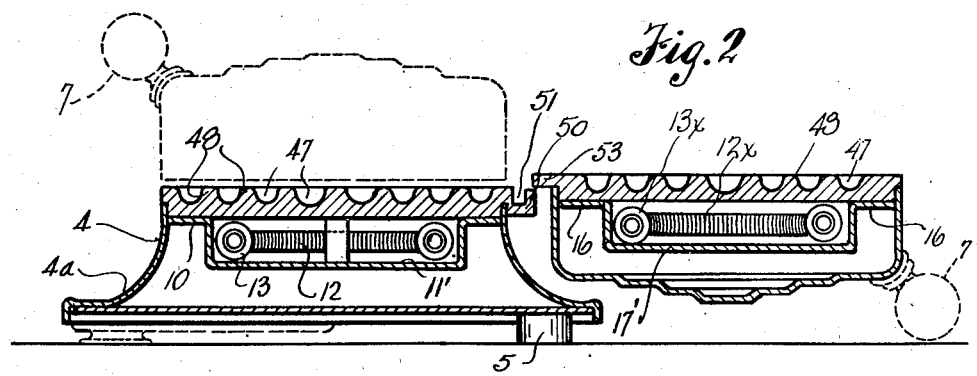
Fig. 2 is a cross sectional view of the utensil on line 2—2 in Fig. 1.

The top section 2 of the device comprises a formed housing 6 of metal, corresponding in outline to the upper portion of the base section, and provided at the side opposite the hinge connection with a knob, or handle 7, which serves as a convenient means whereby the top section may be swung about the hinge axis between open and closed positions, and also, when the device is in open position, serves as a supporting leg to engage the table top or other surface on which the utensil is placed, to support the heating plates mounted by the two sections, in the same plane, as will be understood by reference to Fig. 2.

Set down somewhat within the top edge of the base housing, is a horizontal plate 10 having two circular basins 11 and 11' formed therein, and each of these basins contains an electrical heating element 12 carried in insulating spools 13 which are suitably fixed to the plate. These elements have electrical connection through means contained within the base housing, with circuit wires leading through a thermostatic switch, designated at 14 in Fig. 3, to a suitable supply of current. In this instance, the flow of current is under control of a switch adjusting knob 15 at the front of the housing.

Fitted in the open side of the housing 6 of the top section 2, as noted in Fig. 2, is a plate 16, and this is formed with two, circular depressions or basins 17 and 17', in the positions as indicated in dotted lines in Fig. 1. These latter basins, 17—17', are of the same size as those formed in the plate 10 of the base section, and when the top section of the utensil is closed over the bottom section, as in Fig. 3, the basins therein and basins 11 and 11' of plate 10, will be substantially in vertical alinement. The basins 17—17' also are equipped with heating elements, designated at 12x, supported by insulators 13x, and these elements are also connected to the supply circuit through switch 14 under control of switch knob 15.

It is to be observed by reference to Figs. 2 and 3 that the plates 10 and 16 are set down within the open side of their respective housings 4 and 6 to provide space for the reception of the interchangeable plates for cake or waffle baking.

It will be explained that the utensil as herein illustrated is equipped with plates for the cooking of waffles. The waffle plates are shown best in Fig. 1, and are designated respectively by reference characters 45 and 46; the plate 45 being the bottom plate and is to be applied to the base section 1 while plate 46 is the top plate and is applied to the top section 2.

The present waffle plates are designed for baking two waffles at a time, and each is therefore formed with two molds, each mold comprising, in the top and bottom plates, a succession of alternating, concentrically arranged grooves and ridges, as designated at 47 and 48, which, in closing of the sections of the utensil together, will be brought into coacting relationship, as understood by the sectional portion of Fig. 3; it being noted that the ridge portions of one plate coincide with the groove portions of the complemental plate when the sections of the utensil are closed as for the baking of a waffle between them.

When the waffle plates are applied, they closely overlie the plates 10 and 14, and the contained heating elements 12 and 12x are uniformly heated over their entire surfaces.

In order that the top section of the utensil may be supported in an open position when such is desired, the plate 46 is provided at the hinge side with laterally extending lugs 50, formed with square cut, vertical, walled channels 51 in alinement, and the plate 45 is formed at the adjacent edge with lateral wings 53, adapted, when the plate 45 has been swung substantially to a vertical plane, to be received in the channels 51, thus to support the top section in an upright position, and just slightly inclined toward the full open position, as noted by reference to Fig. 4. When it is desired to seat the wings 53 in the lug channels, the section 2 is merely swung to upright position, through its hinge connections, then slightly lifted to permit the wings to be received in the slots, then is lowered to the position as shown in Fig. 5. It will later be understood that the hinge connection 3 provides for the movement. To unseat the wings, the section is lifted slightly, then it may be swung to closed position.

The hinge structure 3 whereby the two sections of the utensil are joined, is illustrated best in Figs. 3 and 4, and it comprises the following parts: Fixed on the back wall of the housing 6 is a hinge plate 60 having a rearwardly directed flange 61 along its lower edge terminating in a cylindrical curl 62 in which a hinge pin 63 is contained, with its ends extending slightly beyond the ends of the flange.

Likewise, fixed on the back wall of housing 4 is a hinge plate 66 having an out-turned flange 67 along its top edge, and this is formed with a vertically, downturned plate 68, with opposite end extensions 69 and 69' which lie in vertical planes.

Disposed in a plane parallel with and lying outside of the plate 68, as seen in Fig. 3, is a flat plate 70 with inturned flanges or wings 71 and 71' at its oposite ends. At their upper ends, these wings, respectively, are pivoted on the opposite ends of the hinge pin 63, and formed in the wings lengthwise thereof, are vertical slots 72 which slidably contain the extension portions 69 and 69' of the plate 68 therein. These slots are longer than the height of the extension portions 69 and 69' and therefore the plate 70 may be raised or lowered to the extent permitted by the limits of the slots 72, and this movement is such as required for the usual expansion of waffle batter during a cooking operation. However, the hinging action provided by the connection of pin 63 with the upper ends of the wings 71—71' retains the section 2 in proper relationship to section 1.

The present hinge structure, designated in its entirety by numeral 3, is important as it provides that the two sections 1 and 2 be permanently joined in a hinged connection which accommodates the utensil to expansion that is incident to cooking of batter therein, and at the same time accommodates the device to the interchangeable use of cake and waffle molds without necessitating the disconnection of the hinge.

The provision of the channeled lugs 50, on the base plate, to receive the projections 53 of the top plate, provides for the easy and convenient supporting of the top section in raised position, and in a connection that requires that the top section be lifted in order to effect its release.

It is apparent that the slots 51 might be applied to the top section and the projection 53 put on the other, if such should be desired.

Having thus described my invention, what I claim as new therein and desire to secure by Letters Patent is:

In a cooking utensil of the character described, comprising bottom and top sections, an expanding hinge connecting the sections centrally at the back edge thereof to adapt the top section to be opened upwardly and to swing rearwardly into the same horizontal plane as the lower section, mold plates mounted in said sections for the cooking of a waffle, or the like, between them; said mold plate of the bottom section having lugs projecting therefrom at the hinge side of the utensil at opposite ends of the hinge axis and each formed with a transverse, upwardly opening channel in the vertical plane of the axis, and said plate of the top section being formed with flanges at the hinge side corresponding to and adapted to be received in said lug channels when the top section has been moved to an upright position, to retain the top in that position, and to be held in the clear of said lugs for full opening of the utensil by expanding of the hinge.

ROY N. DICKEY.